United States Patent [19]

Kondo et al.

[11] Patent Number: 4,564,321

[45] Date of Patent: Jan. 14, 1986

[54] END-MILLING CUTTER WITH DRILLING CAPABILITY

[75] Inventors: Kunio Kondo; Katutoshi Haga, both of Toyota; Tokunari Takeuchi, Chita, all of Japan

[73] Assignee: Fuji Seiko Limited, Aichi, Japan

[21] Appl. No.: 604,931

[22] Filed: Apr. 27, 1984

[30] Foreign Application Priority Data

May 13, 1983 [JP] Japan .................. 58-72234[U]

[51] Int. Cl.$^4$ .................. B23C 5/20; B23B 51/00
[52] U.S. Cl. .................. 407/36; 408/224; 408/713
[58] Field of Search .................. 407/34, 35, 36, 54, 407/55, 56, 58, 59, 63, 40, 42, 43, 48; 408/186, 199, 713, 227, 228, 223, 224, 230, 231

[56] References Cited

U.S. PATENT DOCUMENTS

| 3,963,365 | 6/1976 | Shallenberger | 408/713 |
| 4,182,587 | 1/1980 | Striegl | 407/48 |
| 4,194,862 | 3/1980 | Zweekly | 408/224 |
| 4,265,574 | 5/1981 | Eckle | 407/54 |
| 4,280,774 | 7/1981 | Hayama | 407/36 |
| 4,367,991 | 1/1983 | Grafe et al. | 408/224 |

FOREIGN PATENT DOCUMENTS

| 99287 | 8/1979 | Japan | 407/55 |
| 2079656 | 1/1982 | United Kingdom | 407/36 |

Primary Examiner—Leonidas Vlachos
Assistant Examiner—Jerry Kearns
Attorney, Agent, or Firm—Parkhurst & Oliff

[57] ABSTRACT

An end milling tool having an elongate body which has two flutes defining two elongate lands extending generally in an axial direction of the body. The two lands have first and second flute surface each facing in a direction of rotation of the end mill. The end mill carries at least two peripheral-cutting inserts for peripheral milling, an inner drilling insert for cutting a radially inward portion of a hole, and an outer drilling inserts for cutting a radially outward portion of the hole, each insert being replaceable and of a generally flat configuration having a back face held in contact with the appropriate surface of the body, and a front face opposite to the back face and including a cutting edge. The peripheral-cutting inserts are disposed in a staggered manner alternately in the first and second flute surfaces, such that the first flute surface carries the peripheral-cutting insert which is nearest to the end face of the body. The inner drilling insert is disposed on the end face of the land having the first flute surface, and the outer drilling insert is disposed in an area of the second flute surface adjacent to the end of the body.

20 Claims, 8 Drawing Figures

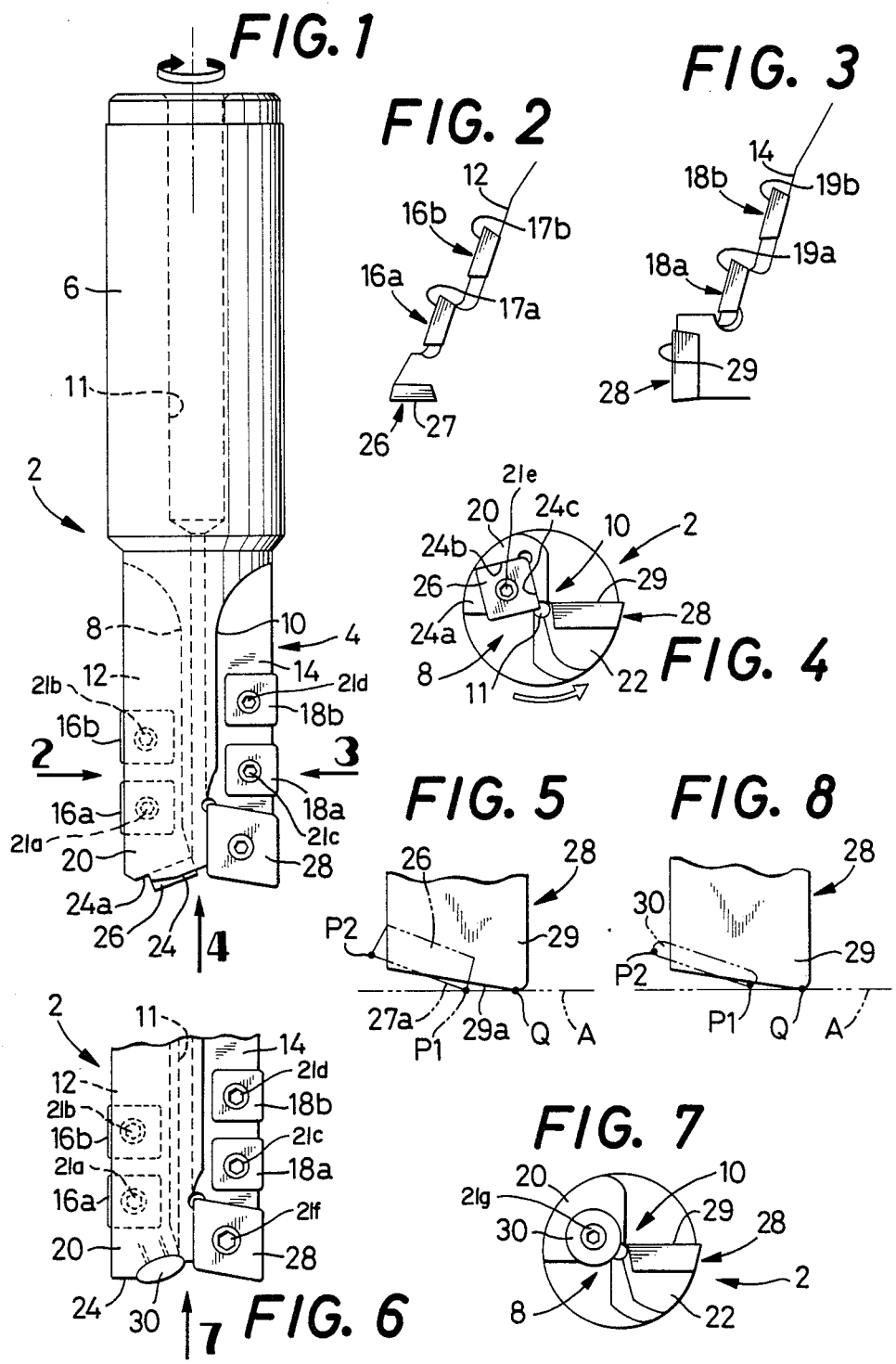

END-MILLING CUTTER WITH DRILLING CAPABILITY

BACKGROUND OF THE INVENTION

1. Field of the Invention

The present invention relates generally to an end mill having a drilling capability to drill a hole, as well as a peripheral-milling capability to cut a slot or groove. More particularly, the invention is concerned with such an end mill which has both peripheral-milling and drilling capabilities, and all cutting edges or blades of which consist of replaceable or disposable inserts.

2. Description of the Prior Art

In the art of cutting tools, there has been a remarkably increasing trend toward the utilization of replaceable or disposable (throw-away) cutting inserts or tips to provide cutting edges, blades, teeth or whatever is appropriate to represent cutting portions of the tools. In the past approach to utilizing such replaceable inserts, drills and end mills have been regarded as different kinds of tools, and consequently treated independently of each other in different ways in an effort to use the inserts. This difference is based on the traditional recognition of incompatibility between the drills and the end mills in arrangement of the replaceble inserts. Accordingly, a slot-cutting operation has required an end mill, while a drilling operation has required a drill, a cutting tool which has been considered distinct from the end mill.

Nevertheless, there has been available a cutting tool which is able to perform both drilling and peripheral-milling cuts, but only within a limited range of a cutting depth of a hole or slot, that is, to a maximum depth of 10 mm or so which is equivalent to a size of the inserts to be used on the tool.

However, a cutting tool with such limited drilling and peripheral-milling capabilities is difficult to attain its dual functions when a hole or slot to be cut has a depth greater than a size of the inserts. No such tools have been known yet in the art.

Therefore, for a machining cycle including combined deep-hole drilling and deep-slot milling cuts (for example, in making dies), tools must be changed from one tool to another each time the machining operation is changed from a drilling cut to an end-milling cut, or vice versa. Alternatively, a workpiece involving such a machining cycle must be transferred through plural machines or machining stations which are exclusively designed to achieve different specific cutting steps. These machining methods are disadvantageous due to a low machining efficiency and a high cost of machining equipment.

SUMMARY OF THE INVENTION

It is accordingly an object of the present invention to provide an end mill having a drilling capability, wherein all cutting edges are provided by replaceable inserts, and which is capable of cutting holes and slots with not only small but also large depths.

According to the present invention, there is provided an end mill with a drilling capability, attachable to a rotatable spindle, and having a generally elongate shank attached to the spindle and a generally elongate body rotatable about an axis thereof with the shank. The instant end mill comprises: at least two replaceable peripheral-cutting inserts of generally flat configuration removably fixed on the body for effecting a peripheral-milling operation; a replaceable inner drilling insert of generally flat configuration removably fixed on the body to cut a radially inward portion of a hole; and a replaceable outer drilling insert of generally flat configuration removably fixed on the body to cut a radially outward portion of the hole. Each of the peripheral-cutting inserts and the inner and outer drilling inserts has a back face held in contact with the surfaces of the body, and a front face opposite to the back face and including at least one cutting edge.

The body of the end mill has two flutes which are formed in its periphery to serve as grooves for removing chips produced by the end mill. These flutes may be straight grooves parallel to the axis of the body or helical grooves. In either case, the two flutes extend generally in the axial direction of the body. The two flutes define first and second raised elongate lands which are peripheral portions of the body extending along the two flutes and having a suitable width. The first and second lands have, on one side thereof, a first flute surface and a second flute surface, espectively, which face in a direction of rotation of the body. On each of the first and second flute surfaces, there is fixed at least one of said at least two peripheral-cutting inserts such that their front faces face in the above direction of rotation. All of the peripheral-cutting inserts fixed on the two flute surfaces are disposed such that their peripheral-cutting edges are located on the circumference of the same assumed cylinder which has an axis on the axis of the body or end mill. Further, the peripheral-cutting inserts are arranged in a staggered or zigzag manner on the first and second flute surfaces, and displaced in the axial direction of the body relative to each other such that cutting paths thereof obtained upon rotation of the body overlap each other in the axial direction and such that one of the peripheral-cutting inserts disposed on the first flute surface is located nearest to a distal end of the body opposite to a proximal end thereof adjacent to the shank.

With the staggered or zigzag arrangement of the peripheral-cutting inserts, the insert disposed on the first flute surface nearest to the distal end of the body is positioned away from the insert on the second flute surface nearest to the distal end, in the axial direction from the proximal end towards the distal end of the body. On an end face of the first land which has the first flute surface, there is fixed the inner drilling insert such that its front face including the face-cutting edge is inclined at a smaller angle with respect to a plane perpendicular to the axis of the body, than with respect to a plane parallel to the above axis. On the other hand, the insert on the second flute surface nearest to the distal end of the body is displaced a given distance away from the insert on the first flute surface nearest to the distal end of the body, in the axial direction from the distal end towards the proximal end. Therefore, the above indicated second flute surface has a comparatively larger unoccupied area at its distal end. On this unoccupied area is disposed the outer drilling insert such that its front face including the face-cutting edge faces in the direction of rotation of the end mill. This outer drilling insert protrudes away from an end face of the second land which has the second flute surface, in the axial direction from the proximal end towards the distal end. The outer drilling insert has also a peripheral-cutting edge or side which lies on the circumference of the assumed cylinder on which the peripheral-cutting edges of the peripheral-cutting inserts are disposed.

With the three kinds of cutting inserts, i.e., at least two peripheral-cutting inserts, an inner drilling insert and an outer drilling insert, which are positioned on the body of an end mill as described above, the end mill of the invention can achieve a drilling cut by its inner and outer drilling inserts when the end mill is moved along its axis. On the other hand, the end mill of the invention can perform an peripheral-milling or slot-cutting operation by its peripheral-cutting inserts and its outer drilling insert. Thus, the instant end mill is provided with both end-milling and drilling capabilities.

Generally, to cut a slot with a smooth finish by using replaceable peripheral-cutting inserts on the periphery of an elongate cutter body, it is required to dispose the inserts in a staggered or zigzag manner alternately on two flute surfaces (side surfaces of elongate lands defined by two flutes) as explained above, so that cutting paths taken by these inserts upon rotation of the end mill overlap each other in the depth direction of the slot (in the axial direction of the body), i.e., a complete continuous cylindrical surface is obtained by a composite locus of the cutting edges of those inserts upon rotation of the body. If such arrangement is not taken, the workpiece may have a stock left uncut or the slot may be cut with cutter marks. In this connection, it is considered that the use of a long peripheral-cutting blade may eliminate the need of using plural inserts of the above arrangement. However, such a blade is difficult to manufacture and the use thereof is not practicable.

On the assumption that plural peripheral-cutting inserts are disposed on two flute surfaces in a staggered manner, a sufficient space for an outer drilling insert may be relatively easily obtained on one of the flute surfaces carrying the peripheral-cutting insert or inserts which are displaced relative to the peripheral-cutting insert or inserts on the other flute surface in the direction towards the proximal end of the cutter body. However, this other flute surface has only a slight space at the distal end portion. Hence, it is substantively difficult to dispose an inner drilling insert on this narrow distal end portion of said other flute surface. Even if it was possible, the size of the inner drilling insert would be limited, and a satisfactory cutting capability could not be obtained from such a small-sized insert. This is a primary reason why the traditional end mill can not be provided with a satisfactory drilling capability.

The present invention was developed based on a finding, unexpected in the prior art, that an end face of one of the lands having the flute surface on which a sufficient space for an inner drilling insert can not be provided, can be used for attaching the inner drilling insert. While the outer drilling insert disposed on the flute surface of the other land is oriented in a substantially upright position parallel to the axis of the end mill, the inner drilling insert disposed on the end face of said one land is oriented substantially perpendicular to the outer drilling insert. This arrangement, which is unique as considered against the traditional design concept, makes it possible to use a comparatively large-sized inner drilling insert without an interference with the peripheral-cutting inserts, thereby giving the end mill a sufficient drilling capability which permits the end mill to be used as a drill as well as an end mill. Thus, the end mill according to the invention makes it possible to cut deep holes and slots as well as shallow holes and slots without conventionally required troublesome tool changes, and consequently with an improved machining efficiency.

BRIEF DESCRIPTION OF THE DRAWING

The above and other objects, features and advantages of the present invention will become more apparent from reading the following description of the preferred embodiments taken in connection with the accompanying drawing in which:

FIG. 1 is an elevational view of one embodiment of an end mill with a drilling capability;

FIGS. 2 and 3 are schematic fragmentary elevational views taken in the direction of the arrows 2 and 3 of FIG. 1, respectively;

FIG. 4 is a bottom plan view taken in the direction of the arrow 4 of FIG. 1;

FIG. 5 is an illustration representing a composite locus taken by an inner and an outer drilling insert of the end mill of FIGS. 1-4 when the end mill is rotated about its axis;

FIG. 6 is an elevational fragmentary view of another embodiment of the invention;

FIG. 7 is a bottom plan view taken in the direction of the arrow 7 of FIG. 6; and FIG. 8 is an illustration, similar to FIG. 5, representing a composite locus taken by an inner and an outer drilling insert of the end mill of FIGS. 6 and 7 when the end mill is rotated about its axis.

DETAILED DESCRIPTION OF THE PREFERRED EMBODIMENTS

Referring first to FIGS. 1-5, there is illustrated a first embodiment of an end mill of the present invention, which is generally indicated at 2 in FIGS. 1 and 4.

This end mill 2 is an elongate cutting tool which has, on its free end side, a generally elongate body 4, and on its fixed end side, a generally elongate shank 6 concentric with the body 4. The end mill 2 is attached at its shank 6 to a spindle (not shown) of a machine tool wherein the spindle is rotatably driven. Thus, the end mill 2 is rotatable about its axis in a direction indicated by arrows in FIGS. 1 and 4. The end mill 2 has two grooves in the form of flutes 8 and 10 of V-shaped in cross section taken across the axis of the end mill, to permit removal or ejection of cutting chips produced by the end mill 2. These V-shaped flutes 8, 10 are formed in the periphery of the body 4, extending from the proximal end of the body 4 adjacent to the shank 6 towards the distal end opposite to the proximal end, such that they are diametrically opposite to each other, i.e., the flutes 8 and 10 are formed with a 180-degree angular spacing circumferentially of the body 4. More specifically, the two flutes 8, 10 are curved in the form of a helix of a suitable angle, for example, having a helix angle of 10-30 degrees relative to the axis of the body 4, so that the distal end portions of the flutes 8, 10 lead their proximal end portions in the direction of rotation of the end mill 2. Further, the end mill 2 has an oil passage 11 formed through radially central portions of the body 4 and the shank 6. The oil passage 11, which is a channel for introducing a coolant, is open at the end of the end mill 2 to direct the coolant flow to the end of the body 4.

The two flutes 8, 10 formed in the body 4 define first and second elongate lands 20 and 22 which are peripheral portions of the body 4 extending along the flutes 8, 10. On one side of the first and second lands 20 and 22, there are formed a first flute surface 12 and a second flute surface 14, respectively. In other words, the first and second lands 20 and 22 have the first and second flute surfaces 12 and 14, respectively, each flute surface 12, 14 constituting one of two side surfaces of the respective land 20, 22.

These first and second flute surfaces 8 and 10 face in the direction of rotation of the end mill 2. On each of these flute surfaces 12, 14, there are removably fixed two rectangular replaceable or disposable (throwaway) peripheral-cutting inserts: two inserts 16a and 16b on the first flute surface 12; and two inserts 18a and 18b on the second flute surface 14. Each of these inserts 16a, 16b, 18a and 18b has a back face held in contact with the appropriate flute surface 12 or 14, and a front face 17a, 17b, 19a, 19b (FIGS. 2 and 3) which is opposite to the back face and includes a peripheral-cutting edge. The peripheral-cutting inserts 16a, 16b, 18a, 18b are fixed on the respective flute surfaces 12, 14 with respective lock screws 21a, 21b, 21c, 21d which extend through the thickness of the inserts defined by their opposite front and back faces. These inserts 16a, 16b, 18a, 18b are disposed on the respective first and second flute surfaces 12, 14 such that the front faces 17a, 17b, 19a, 19b are adapted to face in the direction of rotation of the end mill 2, and such that their peripheral-cutting edges are located on the circumference of an assumed cylinder which is concentric with the body 4, i.e., has an axis on the axis of the end mill 2. Further, the inserts 16a and 16b on the first flute surface 12, and the inserts 18a and 18b on the second flute surface 14, are staggered, or displaced in a zigzag fashion relative to each other in the axial direction of the end mill 2, such that the inserts 16a, 18a, 16b and 18b are successively arranged in this order from the distal end of the body 4 towards the shank 6, alternately in the first and second flute surfaces 12, 14 in order that the loci or paths taken by those inserts upon rotation of the end mill 2 overlap each other in the axial direction. In other words, the positions of the inserts 16a, 16b, 18a and 18b are so determined as to provide a composite locus of motion which is continuous in the axial direction of the end mill 2. While the front faces 17a, 17b, 19a, 19b of the inserts 16a, 16b, 18a, 18b are disposed to face in the rotating direction of the end mill 2, these front faces are inclined, in this specific embodiment, by predetermined angles relative to a plane including the axis of the end mill 2, as illustrated in FIGS. 2 and 3.

With the above indicated staggered or zigzag arrangement of the peripheral-cutting inserts 16a, 16b, 18a, 18b wherein the insert 16a fixed on the first flute surface 12 is located nearest to the distal end of the body 4, there is only a considerably limited open space or unoccupied area on the first flute surface 12 between the insert 16a and the distal end of the body 4.

On an end face 24 of the land 20 having the first flute surface 12 carrying the peripheral-cutting insert 16a which is the nearest to the end face 24, there is removably fixed a replaceable drilling insert 26 for cutting a radially inward portion of a hole, hereinafter referred to as "inner drilling insert 26". This inner drilling insert 26 is rectangular in shape, and has a back face held in contact with the end face 24, and a front face 27 which is opposite to the back face and includes a face-cutting edge. The inner drilling insert 26 is fixed on the end face 24 with a lock screw 21e which extends through the thickness of the insert 26 defined by its front and back faces. This insert 26 is disposed so that its front face 27 is inclinded at a smaller angle with respect to a plane perpendicular to the axis of the end mill 2, than with respect to a plane parallel to the said axis. Described in more detail, the front face 27 of the inner drilling insert 26 is inclinded about 20 degrees relative to the plane perpendicular to the axis of the end mill 2, such that an outward side of the front face 27 radially outwardly of the body 4 is located away from a radially inward side thereof in the axial direction from the shank 6 towards the body 4, as shown in FIG. 1. At the same time, the front face 27 is inclined about 5-10 degrees relative to the above perpendicular plane, such that the face-cutting edges (sides of the rectangular insert which are able to cut) which lead in the direction of rotation of the end mill 2, are located away from the non-cutting trailing edges (sides of the insert which are unable to cut) in the axial direction from the shank 6 toward the body 4, as shown in FIG. 2.

Further, as illustrated in the bottom view of FIG. 4, the rectangular insert 26 is oriented so that one of the four corners is located on the axis of the end mill 2, that is, on the axis of the oil passage 11, and another corner diagonal to the above one corner is located on or radially inwardly of the circumference of, i.e., not radially outwardly of, the previously indicated assumed cylinder of rotary-motion locus of the peripheral-cutting inserts 16a, 16b, 18a, 18b. Thus, the inner drilling insert 26 is positioned so that the leading face-cutting edges may operate to remove stock of a workpiece and allow the non-cutting trailing edges to follow the leading face-cutting edges. The end face 24 of the first land 20 on which the inner drilling insert 26 is fixed, is provided with a seat 24a-c on which the inner drilling insert 26 is locked with a lock screw 21e at a predetermined position. The seat 24a-c comprises a seat surface 24a bearing the back face of the insert 26, and two positioning surfaces 24b and 24c formed perpendicular to the seat surface 24a. The positioning surfaces 24b, 24c abut on two adjacent side faces of the insert 26 to position the insert 26 on the end face 24.

Since the inner drilling insert 26 is disposed on the end face 24 of the land 20 as described above, there is no possibility of an interference between the insert 26 and the adjacent peripheral-cutting insert 16a. In other words, the insert 26 is not limited in size by the insert 16a and may have dimensions which are necessary to provide a sufficient drilling or face-cutting capability.

On the second flute surface 14 on which the peripheral-cutting inserts 18a and 18b are provided, there exists a comparatively large space or area between the insert 18a and the end face of the land 22. This space is utilized to removably attach a parallelogramic replaceable drilling insert 28 for cutting a radially outward portion of a hole. This insert 28 is hereinafter referred to as the "outer drilling insert". The outer drilling insert 28 has a back face held in contact with the second flute surface 14, and a front face 29 which is opposite to the back face and includes a face-cutting edge. The outer drilling insert 28 is fixed on the second flute surface 14 with a lock screw 21f in the same manner as the peripheral-cutting inserts 16a, 16b, 18a, 18b. The insert 28 is positioned so that its front face 29 faces in the direction of rotation of the end mill 2. More specifically stated, the front face 29 is held in parallel to the axis of the end mill 2, and its face-cutting edge on the distal end side of the body 4 (lower side of the insert in FIG. 1) protrudes from the end faces of the lands 20, 22 in the axial direction of the end mill 2. Further, the outer drilling insert 28 is shaped and oriented such that an outward end of the front face 29 radially outward of the body 4 is located away from a radially inward end thereof in the axial direction from the shank 6 towards the body 4. The radially inward side of the insert 28 does not reach the axis of the end mill 2. Stated differently, a cutting path of the outer drilling insert 28 upon rotation of the end mill 2 forms an annular locus which does not include the axis of the body 4. The outer drilling insert 28 has also a cutting edge on the radially outward side. This edge serves as a peripheral-cutting edge which is located on the circumference of the previously discussed cylinder of rotary-motion locus of the peripheral-cutting inserts 16, 18. The insert 28 is displaced relative to the peripheral-cutting insert 16a in the axial direction of the end mill 2 so that the loci of the inserts 16a and 28 overlap each other. Thus, the outer drilling insert 28 as well as the peripheral-cutting inserts 16a, 16b, 18a and 18b are arranged in a staggered or zigzag relation with each other, that is, the insert 28 is adapted to cooperate with the inserts 16a, 16b, 18a and 18b to effect a peripheral-milling or slot-cutting operation. The second flute surface 14 on which the insert 28 is disposed, is provided with a seat (not shown) on which the insert 28 is locked with a screw.

Upon rotation of the end mill 2, the inner and outer drilling inserts 26 and 28 will take a composite cutting path or locus as represented in FIG. 5. As is apparent from the figure, the cutting path taken by the face-cutting edge 27a of the inner drilling insert 26 intersects the cutting path taken by the face-cutting edge 29a of the outer drilling insert 28, and the opposite ends P1, P2 of the face-cutting edge 27a are located outside the cutting path taken by the front face 29 of the outer drilling insert 28. Therefore, the stock removed by these inserts 26 and 28 as chips is divided into four segments. Consequently, the chips produced by the inserts 26, 28 are easily removed or disposed out of a hole or slot being cut. It is noted, in this connection, that the flute 8 is formed with a radial depth which gradually increases in a distal portion of the body 4 adjacent to its distal end, in the axial direction from the shank 6 towards the distal end of the body 4. That is, a corresponding distal portion of a web which joins the lands 20, 22 is gradually decreased in thickness towards the end of the body 4, whereby the bottom of the distal end portion of the flute 8 is located in the vicinity of the axis of the end mill 2, i.e., near the radially inward end of the inner drilling insert 26. This arrangement facilitates the otherwise comparatively difficult removal or ejection of the chips which are produced in the radially inward area of a hole being cut.

As is apparent from FIG. 5, the radially inward end P1 of the face-cutting edge 27a of the insert 26, and a radially outward end Q of the face-cutting edge 29a of the insert 28, are both located in a plane A which is perpendicular to the axis of the end mill 2. In this arrangement, a bottom surface of a slot to be cut by these inserts 26, 28 can be made flat. However, the slot can be cut with a flat bottom surface even when the edge position P1 is located away from the plane A in the axial direction towards the shank 6. It is further noted that the edge position P1 may be located away from the plane A in the axial direction from the shank 6 towards the body 4, in the case where it is not required to cut a slot with a flat bottom.

When the end mill 2 constructed as described hitherto is advanced in its axial direction while it is rotated, the inner and outer drilling inserts 26 and 28 achieve a drilling cut. When the rotating end mill 2 is moved perpendicularly to its axis, the peripheral-cutting inserts 16a, 16b, 18a, 18b and the outer drilling insert 28 effect an peripheral-milling or slot-cutting operation. Consequently, the end mill 2 of the invention is capable of continuously cutting holes and slots with relatively large depths, e.g., 40 or 50 cm, as well as relatively shallow holes and slots, in desired combinations thereof, without an aid of other cutting tools. Thus, the end mill 2 is considerably versatile, and useful particularly for preparing dies and molds.

While the invention has been described in its preferred embodiment referring to FIGS. 1–5, it is to be understood that the invention is not limited thereto; but may be otherwise embodied. For example, it is possible to provide three or more peripheral-cutting inserts on each of the first and second flute surfaces 12 and 14. In this instance, the length of a cylinder of rotary-motion cutting locus may be increased, and consequently the end mill 2 may be given amplified drilling and end-milling capability to cut a deeper hole or slot.

Although the preceding embodiment uses an inner drilling insert 26 which is rectangular or square in shape, the end mill 2 may use a circular or round inner drilling insert 30 of generally flat configuration as shown in FIGS. 6–8. In these figures, the same reference characters as used in FIGS. 1–5 are used to identify the corresponding parts except the insert 30, so that the previous description of the first embodiment may be referred to for understanding of this alternative embodiment of FIGS. 6–8. The circular inner drilling insert 30 is fixed with a lock screw 21g such that a point on the periphery thereof is located on the axis of the body 4.

It is further possible that the positions and postures of the inner and outer drilling inserts, i.e., the rotary-motion cutting loci or paths of these inserts, may not be limited to those which permit production of four-segmented chips; but may be changed so that the stock is removed in the form of three or two divivided segments of chips.

It will be obvious that other changes and modifications may be made without departing from the scope of the invention defined in the appended claims.

What is claimed is:

1. An end mill having a drilling capability, and attachable to a rotatable spindle, said end mill comprising:

a generally elongate shank attached to said spindle;

a generally elongate body rotatable about an axis thereof with said shank, and having a proximal end adjacent to said shank and a distal end opposite to said proximal end, said body having two flutes which are formed in a periphery thereof generally in an axial direction thereof and which serve as grooves for removing chips, said two flutes defining a first and a second elongate land extending along said two flutes, said first and second lands having, on one side thereof, a first flute surface and a second flute surface, respectively, which face in a direction of rotation of said body, said lands having end faces at said distal end of the body;

at least two replaceable peripheral-cutting inserts of generally flat configuration removably fixed on said first and second flute surfaces for effecting a peripheral milling operation, each of said peripheral-cutting inserts having a back face held in contact with the respective one of said first and second flute surfaces, and a front face opposite to said back face, said front face including a peripheral-cutting edge and facing in said direction of rotation, said peripheral-cutting inserts being disposed in a staggered manner alternately in said first and second flute surfaces, and being displaced in said axial direction relative to each other such that cutting paths thereof obtained upon rotation of said body overlap each other in said axial direction and such that one of said peripheral-cutting inserts disposed on said first flute surface is located nearest to said distal end of said body, the peripheral-cutting edges of said peripheral-cutting inserts being located on a circumference of the same assumed cylinder having an axis on said axis of said body;

a replaceable inner drilling insert of generally flat configuration removably fixed on the end face of said first land for cutting a radially inward portion of a hole, said inner drilling insert having a back face held in contact with the end face of said first land and a front face opposite to said back face, said front face including at least one face-cutting edge and being inclined at a smaller angle with respect to a plane perpendicular to said axis of the body, than with respect to a plane parallel to said axis; and a replaceable outer drilling insert of generally flat configuration removably fixed on said second flute surface for cutting a radially outward portion of said hole, said outer drilling insert having a back face held in contact with said second flute surface, and a front face opposite to said back face, said front face including a face-cutting edge and a peripheral cutting edge and facing in said direction of rotation, said outer drilling insert being located away from said one of the peripheral-cutting inserts on said first flute surface, in said axial direction from said proximal end towards said distal end, such that a cutting path thereof and a cutting path of said one of the peripheral-cutting inserts upon rotation of said body overlap each other in said axial direction, said peripheral-cutting edge being located on the circumference of said assumed cylinder.

2. An end mill as set forth in claim 1, wherein said inner drilling insert is inclined with respect to said plane perpendicular to said axis such that an outward side of said front face thereof radially outwardly of said body is located away from a radially inward side thereof in said axial direction from said proximal end towards said distal end.

3. An end mill as set forth in claim 1, wherein said inner drilling insert is inclined with respect to said plane perpendicular to said axis such that said at least one face-cutting edge thereof is located away from non-cutting trailing edges thereof in said axial direction from said proximal end towards said distal end.

4. An end mill as set forth in claim 1, wherein said inner drilling insert is rectangular in shape, and one of four corners thereof is located on said axis of the body, another of said four corners diagonal to said one corner being located at one of positions on and within the circumference of said assumed cylinder.

5. An end mill as set forth in claim 1, wherein said first land has a seat formed in said end face thereof to support and orient said inner drilling insert, said seat comprising a seat surface bearing said back face of the inner drilling insert, and two positioning surfaces abutting on two adjacent side faces of said inner drilling insert.

6. An end mill as set forth in claim 1, wherein said front face of said outer drilling insert is parallel to said axis of the body.

7. An end mill as set forth in claim 1, wherein said face-cutting edge of said outer drilling insert protrudes from said end face of said second land, in said axial direction from said proximal end towards said distal end.

8. An end mill as set forth in claim 7, wherein an outward end of said face-cutting edge of said outer drilling insert, radially outwardly of said body, is located away from a radially inward end of said face-cutting edge of the outer drilling insert in said axial direction from said proximal end towards said distal end.

9. An end mill as set forth in claim 7, wherein a cutting path of said outer drilling insert upon rotation of said body forms an annular locus which does not include said axis of the body.

10. An end mill as set forth in claim 1, wherein in a composite cutting path taken by said inner and outer drilling inserts upon rotation of said body, a cutting path taken by said at least one face-cutting edge of said inner drilling insert intersects a cutting path taken by said face-cutting edge of said outer drilling insert, opposite ends of said at least one face-cutting edge of said inner drilling insert being located outside a cutting path taken by said working face of said outer drilling insert.

11. An end mill as set forth in claim 10, wherein the radially outward one of said opposite ends of said at least one face-cutting edge of said inner drilling insert, and a radially outward end of the face-cutting edge of said outer drilling insert, are both located in a plane perpendicular to said axis of the body.

12. An end mill as set forth in claim 1, wherein said flutes are two grooves of V-shaped cross section taken across said axis of the body.

13. An end mill as set forth in claim 12, wherein said two grooves are formed opposite to each other diameterically of said body.

14. An end mill as set forth in claim 1, wherein said two flutes are helical grooves having a helix angle of about 10–30 degrees.

15. An end mill as set forth in claim 1, wherein a depth of at least one of said two flutes gradually increases in a distal portion of said body adjacent to said distal end in said axial direction from said proximal end towards said distal end, a radially inward end of said inner drilling insert being located in the vicinity of a bottom of said at least one flute.

16. An end mill as set forth in claim 1, wherein said inner drilling insert is circular in shape.

17. An end mill as set forth in claim 16, wherein a point on a periphery of said circular inner drilling insert is located on said axis of the body.

18. An end mill as set forth in claim 1, wherein said shank and said body have an oil passage formed through radially central portions thereof and open at said distal end of the body to introduce a coolant to said distal end, a radially inward end of said inner drilling insert being located on an axis of said oil passage.

19. An end mill as set forth in claim 1, wherein each of said peripheral-cutting inserts and said outer drilling insert are removably fixed to said flute surfaces by a lock screw extending through the thickness of each said insert defined by its said front and back faces.

20. An end mill as set forth in claim 1, wherein said inner drilling insert is removably fixed on said end face by a lock screw extending through the thickness of said insert defined by its said front and back faces.

* * * * *